(12) United States Patent
Park et al.

(10) Patent No.: US 12,031,594 B2
(45) Date of Patent: Jul. 9, 2024

(54) PLUNGING SHAFT AND DRIVE SHAFT ASSEMBLY INCLUDING SAME

(71) Applicant: ERAE AMS CO., LTD, Daegu (KR)

(72) Inventors: Se Jung Park, Daegu (KR); Dal Soo Jang, Daegu (KR)

(73) Assignee: ERAE AMS CO., LTD, Daegu (KR)

( * ) Notice: Subject to any disclaimer, the term of this patent is extended or adjusted under 35 U.S.C. 154(b) by 393 days.

(21) Appl. No.: 17/425,754

(22) PCT Filed: Jan. 17, 2020

(86) PCT No.: PCT/KR2020/000844
§ 371 (c)(1),
(2) Date: Jul. 26, 2021

(87) PCT Pub. No.: WO2020/159127
PCT Pub. Date: Aug. 6, 2020

(65) Prior Publication Data
US 2022/0163068 A1    May 26, 2022

(30) Foreign Application Priority Data
Jan. 28, 2019    (KR) .......................... 10-2019-0010462

(51) Int. Cl.
*F16D 3/06* (2006.01)
*F16C 3/035* (2006.01)

(52) U.S. Cl.
CPC .............. *F16D 3/065* (2013.01); *F16C 3/035* (2013.01)

(58) Field of Classification Search
CPC .... F16C 3/03; F16C 3/035; F16D 3/06; F16D 3/065; F16D 2200/0212; Y10S 464/906
(Continued)

(56) References Cited

U.S. PATENT DOCUMENTS

| | | | | |
|---|---|---|---|---|
| 754,066 A | * | 3/1904 | Hoffman | F16D 3/065 |
| | | | | 464/167 |
| 5,026,325 A | * | 6/1991 | Welschof | F16D 3/227 |
| | | | | 464/906 |
| 6,217,456 B1 | | 4/2001 | Jacob | |

(Continued)

FOREIGN PATENT DOCUMENTS

| | | | | |
|---|---|---|---|---|
| DE | 1267479 B | * | 5/1968 | ............. F16D 3/065 |
| DE | 102016102863 A1 | * | 8/2017 | ............. F16D 3/065 |

(Continued)

OTHER PUBLICATIONS

International Search Report for PCT/KR2020/000844 dated May 26, 2020 [PCT/ISA/210].

(Continued)

*Primary Examiner* — Josh Skroupa
(74) *Attorney, Agent, or Firm* — Sughrue Mion, PLLC (57) ABSTRACT

A plunging shaft includes: a first shaft having an outer part defining a cylindrical bore and a through hole; a second shaft having an inner part; a ball spline structure connecting the outer part and the inner part so as to transmit rotational power while being relatively movable with respect to each other; and a sealing member that is inserted into the through hole to seal the through hole. The ball spline structure includes: a plurality of outer ball grooves; a plurality of inner ball grooves; a plurality of power transmitting balls; and a ball cage. The outer part is provided with an air discharging groove for discharging air in a space formed by a front end of the second shaft and the cylindrical bore when the first shaft and the second shaft move relatively move to become closer to each other.

15 Claims, 5 Drawing Sheets

(58) Field of Classification Search
USPC .................................. 464/17, 162, 167, 906
See application file for complete search history.

(56) References Cited

U.S. PATENT DOCUMENTS

| | | | | |
|---|---|---|---|---|
| 6,306,045 | B1* | 10/2001 | Jacob | F16D 3/065 |
| | | | | 464/167 |
| 6,705,948 | B2* | 3/2004 | Cermak | F16C 3/035 |
| | | | | 464/167 |
| 6,902,487 | B2* | 6/2005 | Welschof | F16D 3/065 |
| | | | | 464/167 |
| 7,322,607 | B2* | 1/2008 | Yamada | F16D 3/065 |
| | | | | 280/755 |
| 8,328,649 | B2* | 12/2012 | Disser | F16D 3/065 |
| | | | | 464/167 |

FOREIGN PATENT DOCUMENTS

| | | | | |
|---|---|---|---|---|
| GB | 781954 | A * | 8/1957 | ............. F16D 3/065 |
| JP | 58193933 | A * | 11/1983 | ................ F16D 3/06 |
| JP | 58200814 | A * | 11/1983 | ................ F16C 3/03 |
| JP | 2000-337395 | A | 12/2000 | |
| JP | 2011-007233 | A | 1/2011 | |
| JP | 2018-044607 | A | 3/2018 | |
| KR | 10-2017-0142735 | A | 12/2017 | |
| KR | 10-2018-0009517 | A | 1/2018 | |

OTHER PUBLICATIONS

Written Opinion for PCT/KR2020/000844 dated May 26, 2020 [PCT/ISA/237].

* cited by examiner

PLUNGING SHAFT AND DRIVE SHAFT ASSEMBLY INCLUDING SAME

CROSS REFERENCE TO RELATED APPLICATIONS

This application is a National Stage of International Application No. PCT/KR2020/000844 filed Jan. 17, 2020, claiming priority based on Korean Patent Application No. 10-2019-0010462 filed Jan. 28, 2019.

TECHNICAL FIELD

The present invention relates to a drive shaft assembly that is used in a drive system of a vehicle.

BACKGROUND ART

A drive shaft assembly that is used in a drive line of a vehicle includes an intermediate shaft and constant velocity joints that are coupled to both sides thereof. Such a drive shaft assembly may also be configured such that an intermediate shaft is formed in a type of a plunging shaft capable of plunging so that a length in a longitudinal direction can be varied.

The plunging shaft consists of an inboard shaft that is connected to an inboard joint and an outboard shaft that is connected to an outboard joint, and the inboard shaft and the outboard shaft are configured to move relatively with respect to one another via a ball spline structure so as to undergo the plunging motion. The plunging structure may include an outer part that is provided at an inner end portion of the outboard shaft, an inner part that is provided at an outer end portion of the inboard shaft and is inserted into the outer part, outer and inner ball grooves that are respectively formed on an inner circumferential surface of the outer part and an outer circumferential surface of the inner part, balls that are rollably disposed in the outer and inner ball grooves, and a ball cage that houses the balls. In this case, for ease of manufacturing and for securing the strength, the outboard shaft is generally formed as a hollow shaft that defines a through hole in a longitudinal direction and the inboard shaft is formed as a solid shaft.

At this time, the inboard joint and the outboard joint have an inboard boot and an outboard boot respectively, and the inboard boot are fixed respectively to an outer joint member of an inboard joint and an outboard shaft, and the outer boot are fixed to an outer joint member of an outboard joint and an outboard shaft. In such a plunging shaft, when the plunging occurs in a direction in which an outboard shaft and an inboard shaft come closed to each other, an inboard boot is contracted and at the same time a space formed by an outer part and an inner part is reduced, and thereby air moves toward an outboard joint through the through hole of the outboard shaft to cause the outboard boot to be deformed. Deformation of the outboard boot due to air pressure fluctuations have a negative effect on the durability of the boot.

Prior art document: U.S. Pat. No. 6,217,456 (Apr. 17, 2001.)

DETAILED DESCRIPTION OF THE INVENTION

Technical Problem

An object of the present invention is to provide a drive shaft assembly that is capable of preventing a change in the shape of an outboard boot due to a change in air pressure during a plunging motion.

Technical Solution

A plunging shaft according to an embodiment of the present invention includes: a first shaft having an outer part defining a cylindrical bore at one end thereof and a through hole that connecting the cylindrical bore and the other end thereof; a second shaft having an inner part that is longitudinally movably inserted into the cylindrical bore; a ball spline structure connecting the outer part and the inner part so as to transmit rotational power while being relatively movable with respect to each other; and a sealing member that is inserted into the through hole to seal the through hole. The ball spline structure includes: a plurality of outer ball grooves that are extended in the cylindrical bore of the outer part in the longitudinal direction; a plurality of inner ball grooves that are extended on an outer circumferential surface of the inner part in the longitudinal direction and are respectively paired with the plurality of the outer ball grooves; a plurality of power transmitting balls that are respectively disposed in spaces in the spaces formed by the pairs of the outer ball grooves and the inner ball grooves; and a ball cage that is disposed between the outer part and the inner part and houses the power transmitting balls. The outer part is provided with an air discharging groove for discharging air in a space formed by a front end of the second shaft and the cylindrical bore when the first shaft and the second shaft move relatively move to become closer to each other.

The through hole may have a cross-sectional area smaller than the cylindrical bore, and the outer part may have an inclined surface connecting the cylindrical bore and the through hole. The sealing member may include an insertion sealing portion that is inserted into the through hole and an inclined supporting portion that is connected to the insertion sealing portion and contacts the inclined surface to be supported thereby.

The air discharging groove may be disposed between the outer ball grooves.

The air discharging groove may be formed by being recessed at an apex of the outer ball groove.

The air discharging groove may be disposed adjacent to a side of an inlet of the outer ball groove.

A drive shaft assembly according to an embodiment of the present invention includes: a plunging shaft; an inboard shaft and an outboard shaft that are respectively connected to both ends of the plunging shaft; an outboard boot that is connected to both the outboard joint and the plunging shaft; and an inboard boot that is connected to both the inboard joint and the plunging shaft. The plunging shaft includes: a first shaft having an outer part defining a cylindrical bore at one end thereof and a through hole that connecting the cylindrical bore and the other end thereof; a second shaft having an inner part that is longitudinally movably inserted into the cylindrical bore; a ball spline structure connecting the outer part and the inner part so as to transmit rotational power while being relatively movable with respect to each other; and a sealing member that is inserted into the through hole to seal the through hole. The ball spline structure includes: a plurality of outer ball grooves that are extended in the cylindrical bore of the outer part in the longitudinal direction; a plurality of inner ball grooves that are extended on an outer circumferential surface of the inner part in the longitudinal direction and are respectively paired with the plurality of the outer ball grooves; a plurality of power transmitting balls that are respectively disposed in spaces in the spaces formed by the pairs of the outer ball grooves and the inner ball grooves; and a ball cage that is disposed between the outer part and the inner part and houses the power transmitting balls. The outer part is provided with an air discharging groove for discharging air in a space formed by a front end of the second shaft and the cylindrical bore when the first shaft and the second shaft move relatively move to become closer to each other.

The outboard joint may be coupled to an end of the first shaft that is opposite to an end where the outer part is provided, and the inboard joint may be coupled to an end of the second shaft where the inner part is provided.

Advantageous Effects

According to the present invention, since the through hole that is connected to the space formed by the cylindrical bore and the front end of the second shaft is sealed by the sealing member and the air discharging groove for discharging air from this space is formed, air compressed during the decrease of a size of the space formed by the cylindrical bore and the front end of the second shaft when the first shaft and the second shaft relatively move to become closer to each other does not move to the outboard joint but moves to the inboard joint, and accordingly, the outboard boot that is coupled to the outboard joint can be prevented from being deformed by air pressure during the plunging motion.

DETAILED DESCRIPTION OF THE EMBODIMENTS

Embodiments of the present invention will be described in detail with reference to the accompanying drawings hereinafter.

Figure 1:
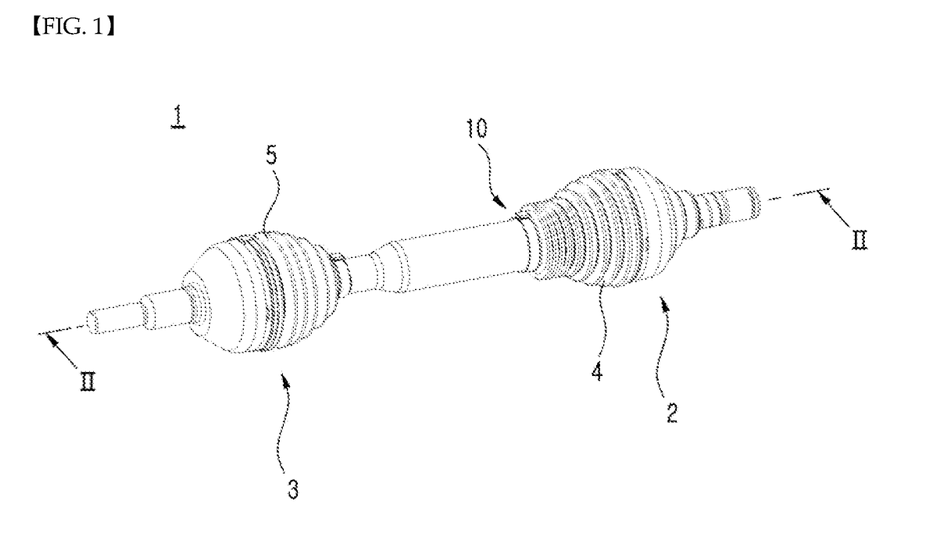
FIG. 1 is a perspective view of a drive shaft assembly according to an embodiment of the present invention.
Figure 2:
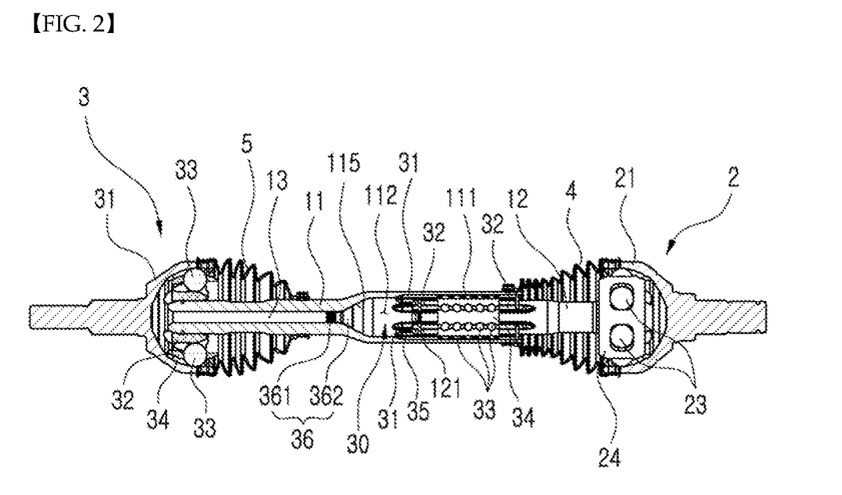
FIG. 2 is a sectional view taken along a line II-II in FIG. 1.

Referring to FIG. 1 and FIG. 2, a drive shaft assembly 1 according to an embodiment of the present invention may include a plunging shaft 10, and an inboard joint 2 and an outboard joint 3 that are respectively connected to both ends of the plunging shaft 10.

The plunging shaft 10 includes a first shaft 11 and a second shaft 12, and the first shaft 11 and the second shaft 12 are connected to one another to be able to move relatively with respect to one another in a longitudinal direction. The plunging shaft 10 has a plunging function by a relative movement in a longitudinal direction of the first shaft 11 and the second shaft 12. The inboard joint 2 and the outboard joint 3 may be a constant velocity joint that can transmit a rotational power and an articulation and may be a Rzeppa joint as an example.

The first shaft 11 and the second shaft 12 respectively includes an outer part 111 and an inner part 121 for performing a plunging function. Referring to FIG. 2. the outer part 111 may be provided to an inboard side of the first shaft 11, and the inner part 121 may be provided to an outboard side of the second shaft 12. The outer part 111 forms a cylindrical bore 112 therein, and the one side of the cylindrical bore 112 may be opened toward the inboard joint 2. The inner part 121 may be inserted into the outer part 111 through the open portion of the cylindrical bore 112. At this time, the inner part 121 is inserted into the cylindrical bore 112 to be movable in a longitudinal direction.

Figure 3:
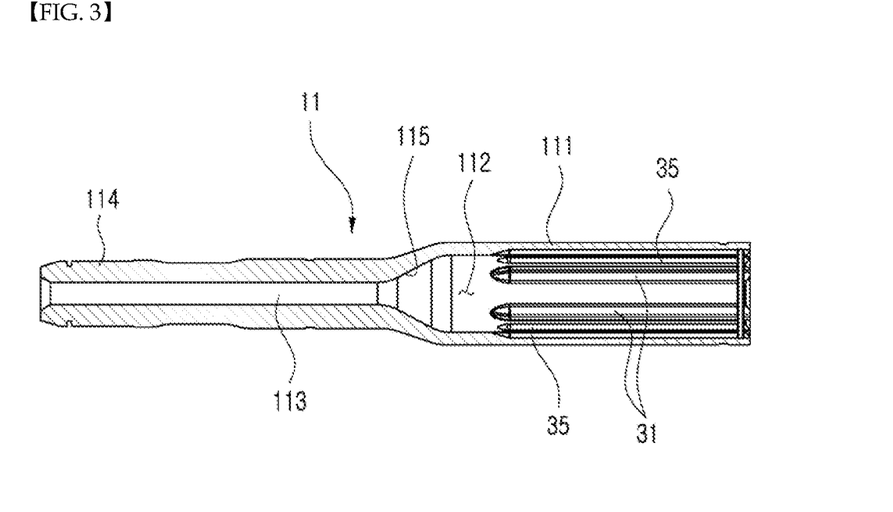
FIG. 3 is a sectional view in a longitudinal direction of a first shaft of a drive shaft assembly according to an embodiment of the present invention.

The first shaft 11 has a through hole 113 connecting the cylindrical bore 112 and the other end thereof As shown in FIG. 3, the first shaft 11 may have an extended portion 114 that is connected to the outer part 111 and extends toward the outboard side and defines the through hole 113 penetrating the extended portion 114 in a longitudinal direction. Meanwhile, the second shaft 12 may be a solid shaft.

The outboard joint 3 may be connected to an outboard side end of the extended portion 114 of the first shaft 11, and the inboard joint 2 may be connected to an inboard side end of the second shaft 12. An inboard boot 4 is coupled respectively to the plunging shaft 10 and the inboard joint 2, and an outboard boot 5 is coupled respectively to the plunging shaft 10 and the outboard joint 3. For example, the inboard joint 2 may include an outer joint member 21, an inner joint member (not shown), and balls 23 and a ball cage 24 that are disposed therebetween, and the inboard boot 4 may be coupled respectively to an outer circumferential surface of the outer joint member 21 and an outer circumferential surface of an inboard side end portion of the first shaft 11. Also, the outboard joint 3 may include an outer joint member 31, an inner joint member 32 and balls 33 and a ball cage 34 that are disposed therebetween, and the outboard boot 5 may be coupled respectively to an outer circumferential surface of the outer joint member 31 and an outer circumferential surface of the outboard side end portion of the first shaft 11. The inboard boot 4 and the outboard boot 5 may be made of material such as rubber and may be fixed by clamps coupled to both ends thereof.

A ball spline structure 30 connects the outer part 111 and the inner part 121 to move relatively to each other in a longitudinal direction wile transmitting a rotational power. The ball spline structure 30 includes a plurality of outer ball grooves 31 that extend in a longitudinal direction in a cylindrical bore 112 of the outer part 111, a plurality of inner ball grooves 32 that extend in a longitudinal direction on an outer circumferential surface and are respectively paired with the plurality of outer ball grooves 31, a plurality of power transmitting balls 33 that are respectively disposed within a pair of the outer ball grooves 31 and the inner ball grooves 32, and a ball cage 34 that is interposed between the outer part 111 and the inner part 121 and houses the power transmitting balls 33.

The outer ball groove 31 may be formed by being recessed radially outwardly on the inner circumferential surface of the outer part 111, and for example six outer ball grooves 31 may be arranged at equal intervals along a circumferential direction. The inner ball groove 32 may be formed by being recessed radially inwardly on the outer circumferential surface of the inner part 121, and for example six inner ball grooves 32 may be arranged at equal intervals along a circumferential direction to face the outer ball grooves 31 respectively. A pair of the outer ball groove 31 and the inner ball groove 32 form a cylindrical space, and the power transmitting ball 3 is disposed in a space formed by the pair of the outer ball groove 31 and the inner ball groove 32. A plurality of the power transmitting balls 33 may be arranged in a line in a space formed by the pair of the outer ball groove 31 and the inner ball groove 32.

Figure 4:
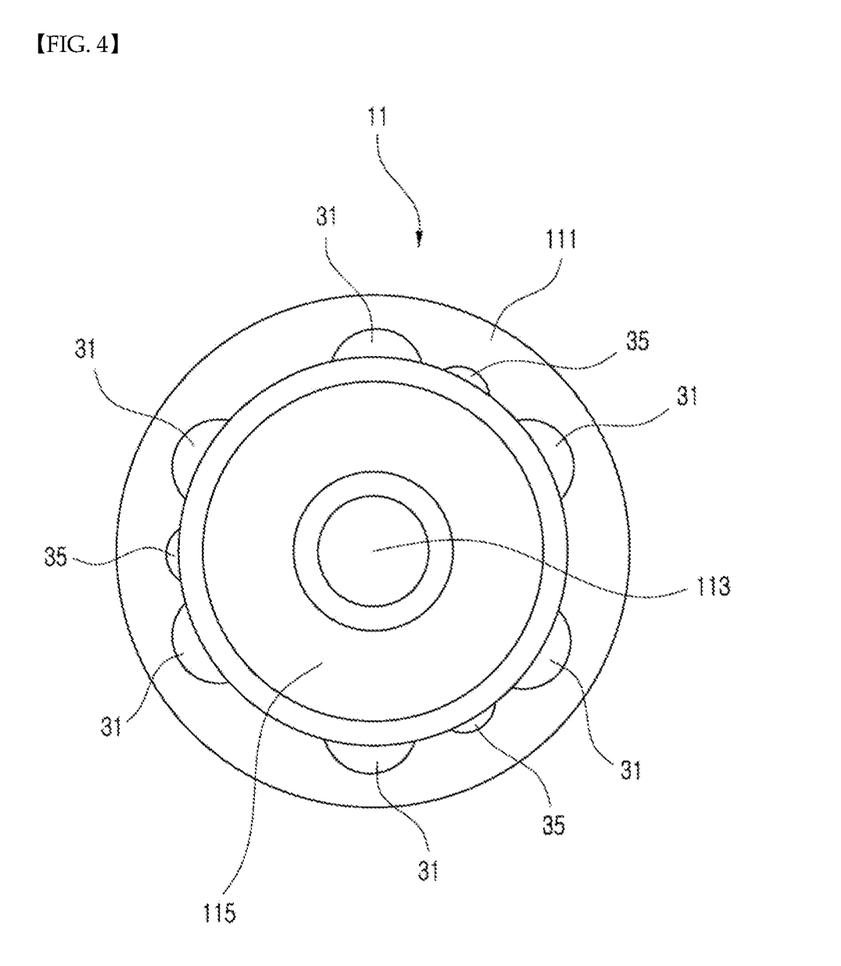
FIG. 4 is a sectional view in a radial direction of a first shaft of a drive shaft assembly according to an embodiment of the present invention.

The outer part 111 may have an air discharging groove 35 for discharging air in a space that is formed between a frontal end of the second shaft 12 and the cylindrical bore 112 when the first shaft 11 and the second shaft 12 move relative to each other to be close to each other. Referring to FIG. 3, the air discharging groove 35 may be formed on an inner circumferential surface of the outer part 111 along a longitudinal direction, and may be configured such that one end thereof is exposed to a space formed in front of an end of the second shaft 12 when the second shaft 12 and the first shaft 11 are in a state in which the second shaft 12 and the first shaft 11 are closet to each other and the opposite end thereof may be connected to the end of the outer part 111. Referring to FIG. 3 and FIG. 4, the air discharging groove 35 may be disposed between the outer ball grooves 31 in a circumferential direction.

A sealing member 36 is inserted into the through hole 113 to seal the through hole 113. For example, as shown in FIG. 2, the sealing member 36 may be fitted into the through hole 113 to block an end of the through hole 113 that is connected to the cylindrical bore 112. The sealing member 36 may be formed of rubber or synthetic resin material capable of forming air sealing. When the first shaft 11 and the second shaft 12 move relatively to become closer to each other, the sealing member 36 can prevented the air in the cylindrical bore 112 from moving to the outboard joint 3 through the through hole 113 to cause the outboard boot 5 to be deformed.

In the regard, as shown in FIG. 2, the through hole 113 may be formed to have a smaller cross-sectional area than the cylindrical bore 112. The outer part 111 has an inclined surface 115 connecting the cylindrical bore 112 and the through hole 113, and the sealing member 36 may include an insertion sealing portion 361 that is inserted into the through hole 113 and an inclined supporting portion 362 that is connected to the insertion sealing portion 361 and contacts the inclined surface 115 to be supported thereby.

Since the through hole 113 that is connected to the space formed by the cylindrical bore 112 and the front end of the second shaft 12 is sealed by the sealing member 36 and the air discharging groove 35 for discharging air from this space is formed, air compressed during the decrease of a size of the space formed by the cylindrical bore 112 and the front end of the second shaft 12 when the first shaft 11 and the second shaft 12 relatively move to become closer to each other does not move to the outboard joint 3 but moves to the inboard joint 2. Accordingly, the outboard boot 5 that is coupled to the outboard joint 3 can be prevented from being deformed by air pressure during the plunging motion.

An air discharging groove according to another embodiment of the present invention will be described with reference to FIG. 5 hereinafter. The same reference numerals are used for the same parts as those described above, and the repeated description will be omitted.

Figure 5:
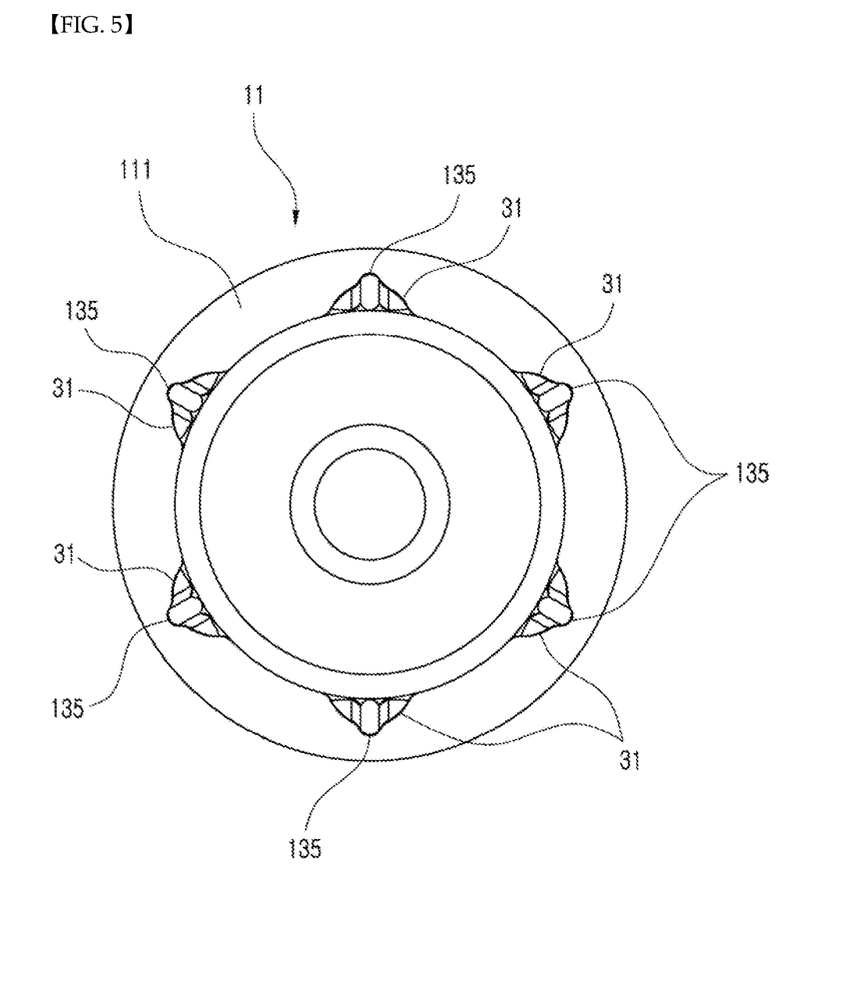
FIG. 5 is a sectional view in a radial direction of a first shaft of a drive shaft assembly according to another embodiment of the present invention.

As shown in FIG. 5, an air discharging groove 135 may be formed by being recessed at an apex of the outer ball groove 31.

An air discharging groove according to yet another embodiment of the present invention will be described with reference to FIG. 6 hereinafter. The same reference numerals are used for the same parts as those described above, and the repeated description will be omitted.

Figure 6:
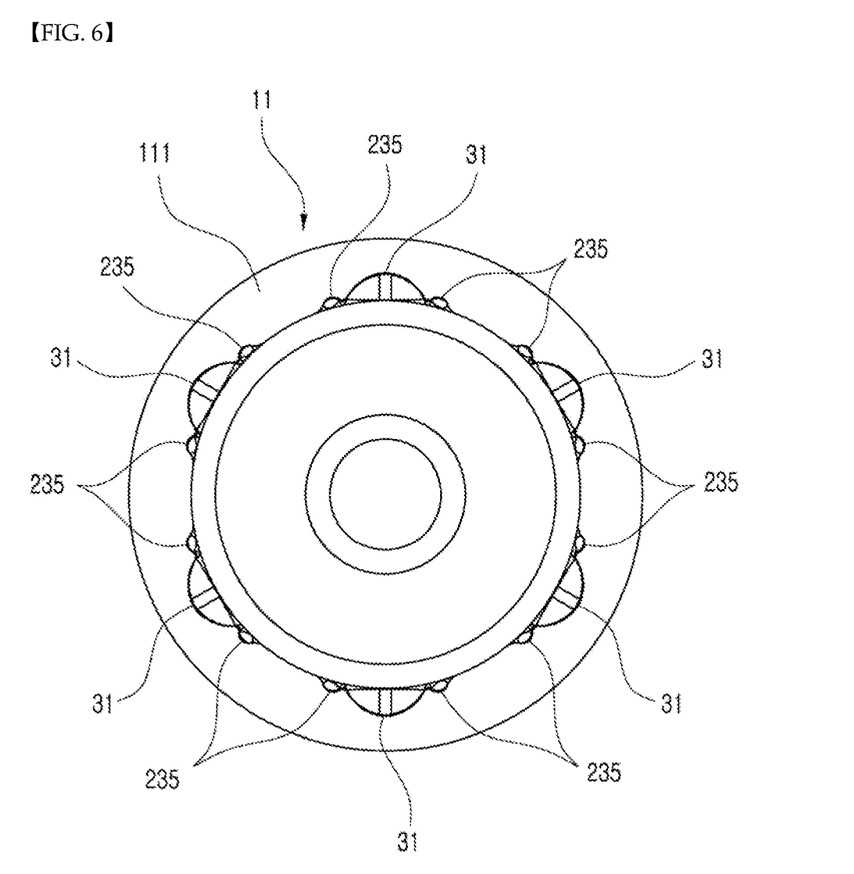
FIG. 6 is a sectional view in a radial direction of a first shaft of a drive shaft assembly according to yet another embodiment of the present invention.

As shown in FIG. 6, an air discharging groove 235 may be formed to be disposed adjacent to both ends of an inlet of the ball groove 31.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a drive shaft assembly that can be used in a power transmitting line of a vehicle, so it has an industrial applicability.

The invention claimed is:
1. A plunging shaft comprising:
a first shaft having an outer part defining a cylindrical bore at one end thereof and a through hole that connecting the cylindrical bore and the other end thereof;
a second shaft having an inner part that is longitudinally movably inserted into the cylindrical bore;
a ball spline structure connecting the outer part and the inner part so as to transmit rotational power while being relatively movable with respect to each other; and
a sealing member that is inserted into the through hole to seal the through hole,
wherein the ball spline structure comprises:
a plurality of outer ball grooves that are extended in the cylindrical bore of the outer part in a longitudinal direction;
a plurality of inner ball grooves that are extended on an outer circumferential surface of the inner part in the longitudinal direction and are respectively paired with the plurality of the outer ball grooves;
a plurality of power transmitting balls that are respectively disposed in spaces in the spaces formed by pairs of the outer ball grooves and the inner ball grooves; and
a ball cage that is disposed between the outer part and the inner part and houses the power transmitting balls,
wherein the outer part is provided with an air discharging groove for discharging air in a space formed by a front end of the second shaft and the cylindrical bore when the first shaft and the second shaft move relatively move to become closer to each other, and
wherein the air discharging groove is formed on an inner circumferential surface of the first shaft and extends to the space formed by the front end of the second shaft and the cylindrical bore.

2. The plunging shaft of claim 1, wherein the through hole has a cross-sectional area smaller than the cylindrical bore, wherein the outer part has an inclined surface connecting the cylindrical bore and the through hole, and wherein the sealing member comprises an insertion sealing portion that is inserted into the through hole and an inclined supporting portion that is connected to the insertion sealing portion and contacts the inclined surface to be supported thereby.

3. The plunging shaft of claim 1, wherein the air discharging groove is disposed between the outer ball grooves.

4. The plunging shaft of claim 1, wherein the air discharging groove is formed by being recessed at an apex of the outer ball groove.

5. The plunging shaft of claim 1, wherein the air discharging groove is disposed adjacent to a side of an inlet of the outer ball groove.

6. A drive shaft assembly comprising:
a plunging shaft;
an inboard joint and an outboard joint that are respectively connected to both ends of the plunging shaft;
an outboard boot that is connected to both the outboard joint and the plunging shaft; and
an inboard boot that is connected to both the inboard joint and the plunging shaft,
wherein the plunging shaft comprises:
a first shaft having an outer part defining a cylindrical bore at one end thereof and a through hole that connecting the cylindrical bore and the other end thereof;
a second shaft having an inner part that is longitudinally movably inserted into the cylindrical bore;
a ball spline structure connecting the outer part and the inner part so as to transmit rotational power while being relatively movable with respect to each other; and
a sealing member that is inserted into the through hole to seal the through hole,
wherein the ball spline structure comprises:
a plurality of outer ball grooves that are extended in the cylindrical bore of the outer part in a longitudinal direction;
a plurality of inner ball grooves that are extended on an outer circumferential surface of the inner part in the longitudinal direction and are respectively paired with the plurality of the outer ball grooves;
a plurality of power transmitting balls that are respectively disposed in spaces in the spaces formed by pairs of the outer ball grooves and the inner ball grooves; and
a ball cage that is disposed between the outer part and the inner part and houses the power transmitting balls,
wherein the outer part is provided with an air discharging groove for discharging air in a space formed by a front end of the second shaft and the cylindrical bore when the first shaft and the second shaft move relatively move to become closer to each other, and
wherein the air discharging groove is formed on an inner circumferential surface of the first shaft and extends to the space formed by the front end of the second shaft and the cylindrical bore.

7. The drive shaft assembly of claim 6, wherein the through hole has a cross-sectional area smaller than the cylindrical bore, wherein the outer part has an inclined surface connecting the cylindrical bore and the through hole, and wherein the sealing member comprises an insertion sealing portion that is inserted into the through hole and an inclined supporting portion that is connected to the insertion sealing portion and contacts the inclined surface to be supported thereby.

8. The drive shaft assembly of claim 6, wherein the air discharging groove is disposed between the outer ball grooves.

9. The drive shaft assembly of one of claim 8, wherein the outboard joint is coupled to an end of the first shaft that is opposite to an end where the outer part is provided, and wherein the inboard joint is coupled to an end of the second shaft where the inner part is provided.

10. The drive shaft assembly of claim 6, wherein the air discharging groove is formed by being recessed at an apex of the outer ball groove.

11. The drive shaft assembly of one of claim 10, wherein the outboard joint is coupled to an end of the first shaft that is opposite to an end where the outer part is provided, and wherein the inboard joint is coupled to an end of the second shaft where the inner part is provided.

12. The drive shaft assembly of claim 6, wherein the air discharging groove is disposed adjacent to a side of an inlet of the outer ball groove.

13. The drive shaft assembly of one of claim 12, wherein the outboard joint is coupled to an end of the first shaft that is opposite to an end where the outer part is provided, and wherein the inboard joint is coupled to an end of the second shaft where the inner part is provided.

14. The drive shaft assembly of claim 6, wherein the outboard joint is coupled to an end of the first shaft that is opposite to an end where the outer part is provided, and wherein the inboard joint is coupled to an end of the second shaft where the inner part is provided.

15. The drive shaft assembly of one of claim 7, wherein the outboard joint is coupled to an end of the first shaft that is opposite to an end where the outer part is provided, and wherein the inboard joint is coupled to an end of the second shaft where the inner part is provided.

* * * * *